(12) United States Patent
Chen

(10) Patent No.: US 12,434,078 B1
(45) Date of Patent: Oct. 7, 2025

(54) FLYING CONVEYOR DEVICE

(71) Applicant: Pin-Hua Chen, Kaohsiung (TW)

(72) Inventor: Pin-Hua Chen, Kaohsiung (TW)

(\*) Notice: Subject to any disclaimer, the term of this patent is extended or adjusted under 35 U.S.C. 154(b) by 77 days.

(21) Appl. No.: 18/611,576

(22) Filed: Mar. 20, 2024

(51) Int. Cl.
| | |
|---|---|
| *A62B 1/20* | (2006.01) |
| *B64D 1/18* | (2006.01) |
| *B64U 10/14* | (2023.01) |
| *B64U 101/47* | (2023.01) |
| *B64U 101/55* | (2023.01) |
| *B65G 69/00* | (2006.01) |

(52) U.S. Cl.
CPC ............... *A62B 1/20* (2013.01); *B64D 1/18* (2013.01); *B64U 10/14* (2023.01); *B64U 2101/47* (2023.01); *B64U 2101/55* (2023.01); *B65G 69/00* (2013.01)

(58) Field of Classification Search
CPC . A62B 1/20; B64D 1/18; B64U 10/14; B65G 69/00
USPC ........................................... 193/25 C
See application file for complete search history.

(56) References Cited

U.S. PATENT DOCUMENTS

| | | | | |
|---|---|---|---|---|
| 2015/0090529 | A1* | 4/2015 | Shieh | A62B 1/20 |
| | | | | 182/48 |
| 2020/0254287 | A1* | 8/2020 | Ren | A62B 5/00 |
| 2023/0322424 | A1* | 10/2023 | Kamiya | B64U 20/70 |
| 2023/0410028 | A1* | 12/2023 | O'Toole | B64D 47/02 |

FOREIGN PATENT DOCUMENTS

| | | | | |
|---|---|---|---|---|
| CN | 106913963 | A | 7/2017 | |
| CN | 114796907 | A | 7/2022 | |
| JP | 3082756 | U | 12/2001 | |
| JP | 2014-518108 | A | 7/2014 | |
| KR | 20170126571 | A | * 11/2017 | ............... A62B 1/20 |
| KR | 20190114699 | A | * 10/2019 | ............... A62B 1/20 |
| KR | 20220032353 | A | * 3/2022 | ............... A62B 5/00 |
| KR | 20230164834 | A | * 12/2023 | ............... A62B 1/22 |

OTHER PUBLICATIONS

Search Report appended to an Office Action, which was issued to Taiwanese counterpart application No. 113114749 by the TIPO on Jul. 11, 2024, with an English translation thereof (2 pages).

\* cited by examiner

*Primary Examiner* — James R Bidwell
(74) *Attorney, Agent, or Firm* — HSML P.C.

(57) ABSTRACT

The flying conveyor device includes a drone and a conveying module. The drone includes a frame body and a plurality of aeronautic units. The frame body defines a frame hole. The aeronautic units are connected to and are spaced apart angularly around the frame body. The conveying module is connected to the drone, and includes a conveying duct connected to the frame body and having a top duct open end connected to the frame body and spatially communicated with the frame hole, a bottom duct open end lower than the top duct open end, and a slide channel extending from the top duct open end to the bottom duct open end. When the drone ascends, the frame body pulls the top duct open end upward to a high level, and a descending movement is allowed through the frame hole and the slide channel.

19 Claims, 14 Drawing Sheets

FLYING CONVEYOR DEVICE

FIELD

The disclosure relates to a conveyor device, and more particularly to a flying conveyor device with a drone and a conveying module.

BACKGROUND

With increasing urbanization and urban development, there is an increasing demand for specialized fire fighting equipment used in high-rise buildings. In some countries, due to urban planning requirements, high-rise buildings may be located in narrow alleyways. Currently, fire rescue operations from high-rise buildings involves the use of aerial ladders on fire engines. The aerial ladders are extended towards fire victims trapped in the high-rise building and serve as an escape route for the trapped fire victims.

However, when the high rise buildings are located in narrow alleyways, the high-rise buildings are likely surrounded by low-rise residential apartments, and the use of aerial ladders, which require room for telescoping and turning, for rescue operations within the narrow alleyways may be unfeasible. Additionally, many fire victims may wish to save important personal items from fire, such as computer mainframes, safety boxes, and other valuables. However, aerial ladders are currently insufficient for this task.

SUMMARY

Therefore, an object of the disclosure is to provide a flying conveyor device that can alleviate at least one of the drawbacks of the prior art.

According to the disclosure, the flying conveyor device includes at least one drone and at least one conveying module. The at least one drone includes a frame body and a plurality of aeronautic units. The frame body loops around an axis to define a frame hole. The aeronautic units are connected to the frame body and are spaced apart angularly around the frame body. The frame hole extends in a top-bottom direction along the axis. The at least one conveying module is connected to the at least one drone, and includes a conveying duct that is connected to the frame body and that has a top duct open end, a bottom duct open end, and a slide channel. The top duct open end is connected to the frame body and is spatially communicated with the frame hole of the frame body. The bottom duct open end is lower than the top duct open end. The slide channel extends from the top duct open end to the bottom duct open end. When the at least one drone ascends, the frame body pulls the top duct open end of the conveying duct upward to a higher altitude, and a descending movement is allowed through the frame hole and the slide channel.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
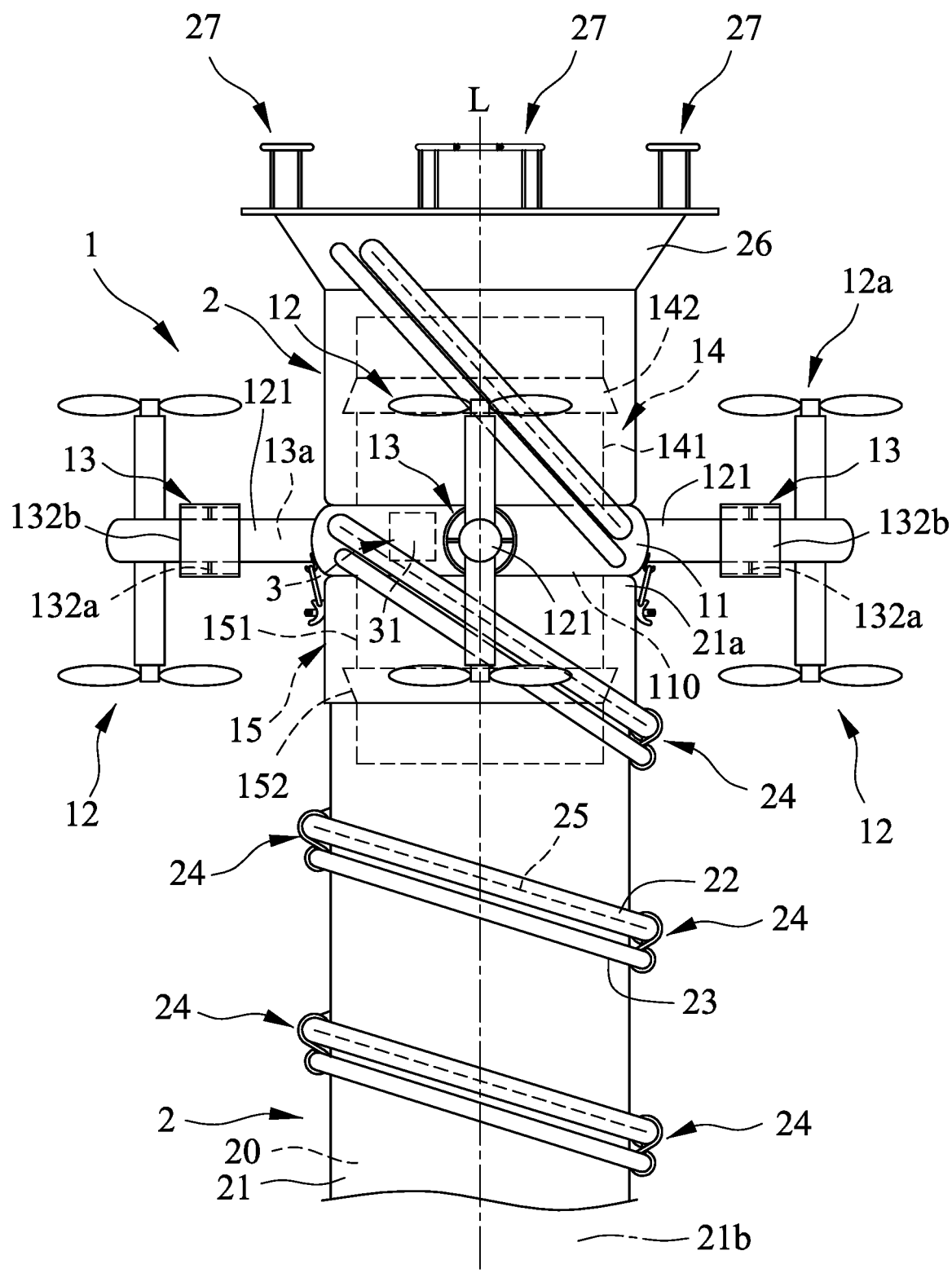
FIG. 1 is a side view illustrating a flying conveyor device according to a first embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIG. 1, a flying conveyor device according to a first embodiment of the present disclosure includes at least one drone 1, at least one conveying module 2 connected to the at least one drone 1, and a communication module 3 connected to the at least one drone 1 used for exchange of information. The drone 1 is used to increase altitude and to lift the conveying module 2, and the conveying module 2 is used for transporting or carrying items and/or persons to the ground from a higher altitude or from the ground to a higher altitude.

Referring to FIGS. 2 to 5 in combination with FIG. 1, the drone 1 includes a frame body 10 that loops around an axis (L) to define a frame hole 110 (more clearly shown in FIG. 5), and a plurality of aeronautic units 12, specifically, four aeronautic units 12 (only three of which are shown in FIG. 1), that are connected to the frame body 10 and that are spaced apart angularly around the frame body 10. The frame body 10 has a looped pipe body 11 that loops around the axis (L), a first pier 15, and a second pier 14. The first pier 15 projects downward from a bottom side of the looped pipe body 11, and loops around the axis (L). The second pier 14 projects upward from a top side of the looped pipe body 11, has a loop-shape and loops around the axis (L). The looped pipe body 11 and the first and second piers 15, 14 cooperatively define the frame hole 110, and the frame hole 110 extends in a top-bottom direction along the axis (L). While there are one drone 1 and four aeronautic units 12 in this embodiment, the number of drones 1 and aeronautic units 12 are not limitations of the disclosure, and may be adjusted according to firefighting or rescue mission requirements.

Figure 2:
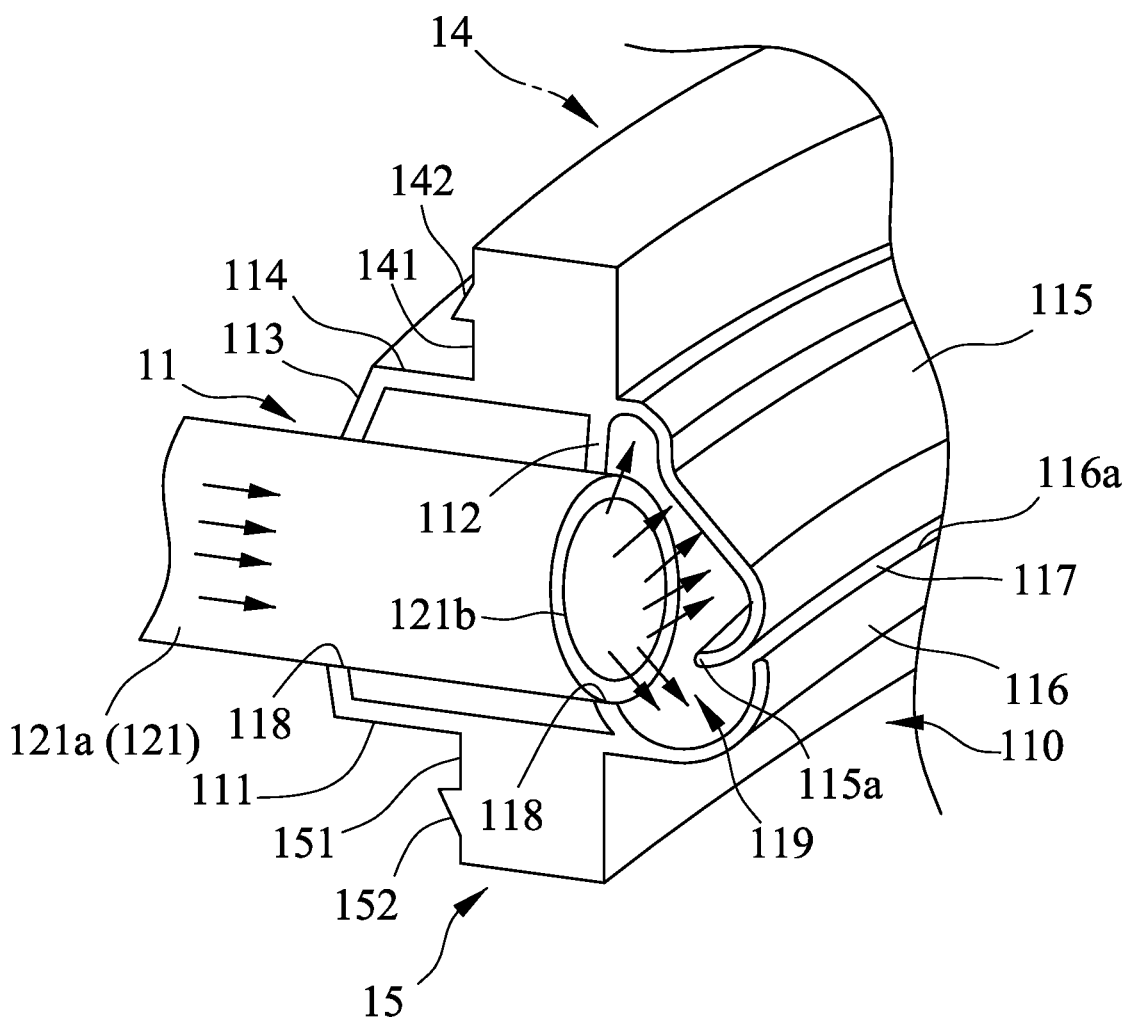
FIG. 2 is a fragmentary partially cross-sectional enlarged view illustrating a frame body of a drone of the first embodiment.
Figure 5:
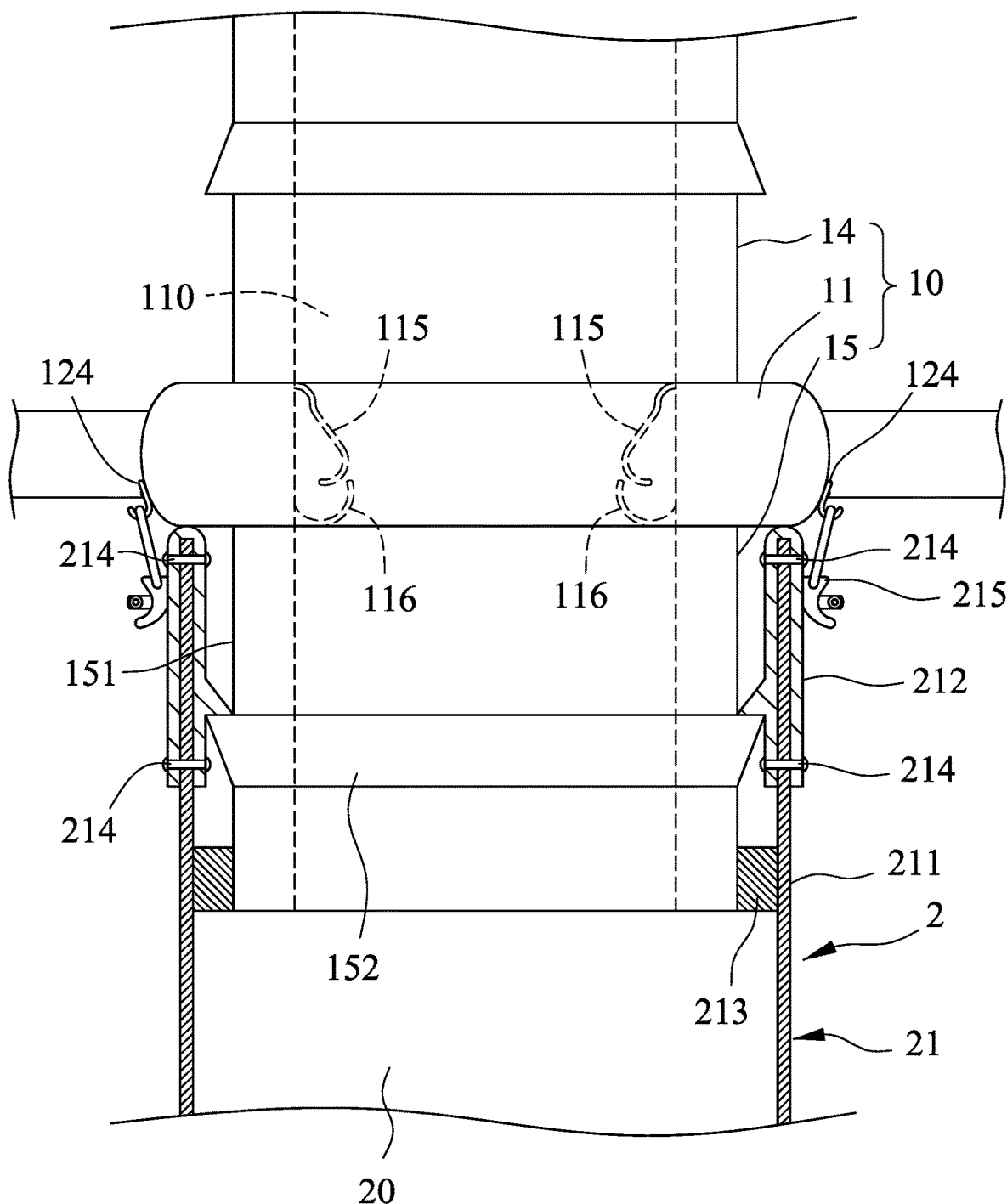
FIG. 5 is a fragmentary partially cross-sectional side view illustrating the conveying module connected to the drone of the first embodiment.

The looped pipe body 11 is tubular and hollow and loops around the axis (L). The looped pipe body 11 has an inner pipe wall 112 that surrounds the axis (L), that bounds the frame hole 110 and curvedly extends in a top-bottom direction, an outer pipe wall 113 that surrounds the inner pipe wall 112 and curvedly extends in the top-bottom direction, a bottom pipe wall 111 that is connected between a bottom end of the inner pipe wall 112 and a bottom end of the outer pipe wall 113, and a top pipe wall 114 that is connected between a top end of the outer pipe wall 113 and a top end of the inner pipe wall 112. The looped pipe body 11 further includes a first sheathing 115 and a second sheathing 116 that are both connected to the inner pipe wall 112. The first sheathing 115 loops around the axis (L), projects inwardly and downwardly into the frame hole 110 from the top end of the inner pipe wall 112, and the second sheathing 116 loops around the axis (L), projects inwardly and upwardly into the frame hole 110 from the bottom of the inner pipe wall 112. The first sheathing 115 and the second sheathing 116 cooperates with the inner pipe wall 112 to confine a looped air delivery space 119 around the axis (L) which is communicated with the frame hole 110. More specifically, the second sheathing 116 has an uppermost end 116a that is spaced apart from the inner pipe wall 112 and that is higher than the bottom end of the inner pipe wall 112 and lower than the top end of the inner pipe wall 112. The first sheathing 115 partially extends into a space between the second sheathing 116 and the inner pipe wall 112 and has a lowermost end 115a that is spaced apart from the uppermost end 116a and the inner pipe wall 112, and that is lower than the uppermost end 116a and higher than the bottom end of the inner pipe wall 112. The first sheathing 115 and the second sheathing 116 have overlapping portions that extend between a level of the uppermost end 116a and a level of the lowermost end 115a and that form therebetween an air delivery opening 117 which extends upward from the looped air delivery space 119. The looped pipe body 11 further includes multiple pairs of radial through holes 118 (only one pair of radial through holes are shown in FIG. 2), which are angularly spaced apart around the axis (L), and each pair of which are formed in the outer pipe wall 113 and the inner pipe wall 112, respectively, and a plurality of latch hooks 124 that are disposed on the outer pipe wall 113 in an angularly spaced apart manner (only two of which are shown in FIG. 5). The looped pipe body 11 is hollow and thus reduces the weight of the drone 1 and contributes a space for accommodating and installing. It should be noted that in some embodiments the drone 1 may be equipped with drone accessories, such as circuit boards, control circuit elements, air supply pipelines, and batteries etc. In this embodiment, the first and second sheathings 115, 116 in combination with air supply units 13 (which will be described in detail hereinafter) guide airflow of ambient air into the frame hole 110.

Figure 3:
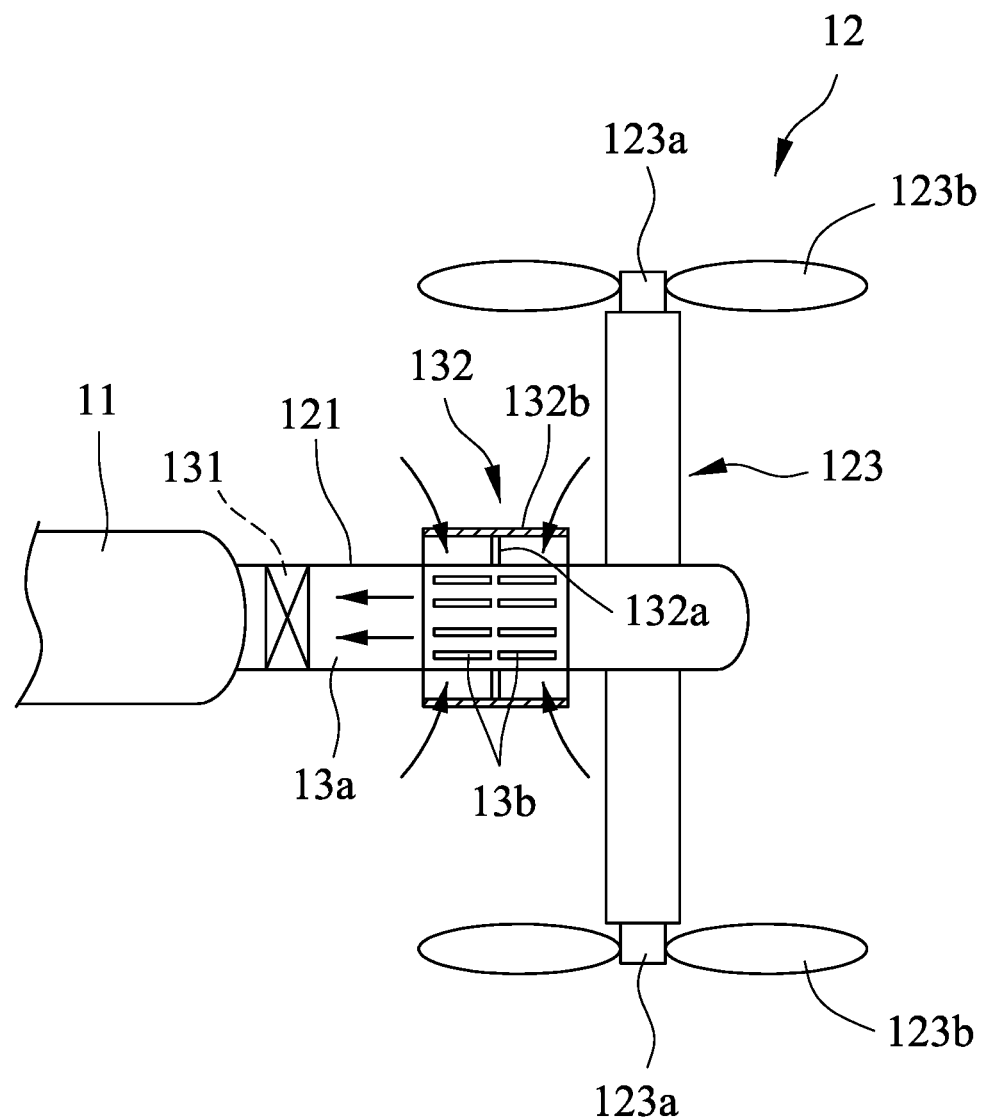
FIG. 3 is a fragmentary schematic side view illustrating an aeronautic unit of the drone and a looped pipe body of the frame body of the first embodiment.

The aeronautic units 12 are adapted to provide lift to the conveying module 2. Each of the aeronautic units 12 has a propeller 12a, and a supporting pipe 121 that interconnects between the looped pipe body 11 and the propeller 12a. In this embodiment, the supporting pipe 121 of each aeronautic unit 12 extends radially relative to the axis (L), and has an inner pipe portion 121a that is connected to the looped pipe body 11 opposite to the aeronautics unit 12, and that penetrates through the through holes 118 of the outer pipe wall 113 and the inner pipe wall 112 to extend into and communicate with the frame hole 110. The inner pipe portion 121a of the supporting pipe 121 has an innermost end 121b communicated with the looped delivery space 119. The propeller 12a of each aeronautic unit 12 includes a fixed propeller component 123 connected to the supporting pipe 121 on a side of the supporting pipe 121 that is distal to the looped pipe body 11 (one of which is shown in FIG. 3). The fixed propeller component 123 includes two propeller shafts 123a, and two propeller blade assemblies 123b that are respectively mounted to the propeller shafts 123a and that are operable to provide lift. In this embodiment, the propeller 12a of each of the aeronautics units 12 may be a ducted propeller fan; however, this is not a limitation of the disclosure.

The drone 1 further has a plurality of air supplying units 13 respectively disposed on the aeronautic units 12. Each of the air supplying units 13 includes an air duct 13a, a plurality of air inlet holes 13b, a power-driven air suction unit 131, and an anti-dust cover 132. The air duct 13a is bounded by the respective supporting pipe 121 and communicates with the frame hole 110 of the frame body 10. The air inlet holes 13b extend from an outer surface to an inner surface of the respective supporting pipe 121 to communicate with the air duct 13a. The power-driven air suction unit 131 is disposed inside the air duct 13a to draw air from the air inlet holes 13b into the air duct 13a and thereafter to the frame hole 110. The anti-dust cover 132 is sleeved over the respective supporting pipe 121. Each anti-dust cover 132 includes a support frame 132a mounted around a portion of the respective supporting pipe 121 where the air inlet holes 13b are formed, and an anti-dust cap 132b that is disposed around and connected to the support frame 132a, that is spaced apart from the respective supporting pipe 121 by the support frame 132a, and that is adapted to prevent dust from entering the air inlet holes 13b.

The second pier 14 has an extending section 141 that extends away from the top pipe wall 114, and a barb structure 142 disposed on the extending section 141 distally to the looped pipe body 11. The first pier 15 has an extending section 151 that extends away from the bottom pipe wall 111, and a barb structure 152 that is disposed on the extending section 151 distally to the looped pipe body 11, and that is for connecting with the conveying module 2. In this embodiment, the second pier 14 extends upward to be away from the ground, while the first pier 15 extends downward to approach the ground. The barb structure 152 of the first pier 15 is used to firmly hold the conveying module 2 so that the conveying module 2 can be moved along with the drone 1.

Figure 10:
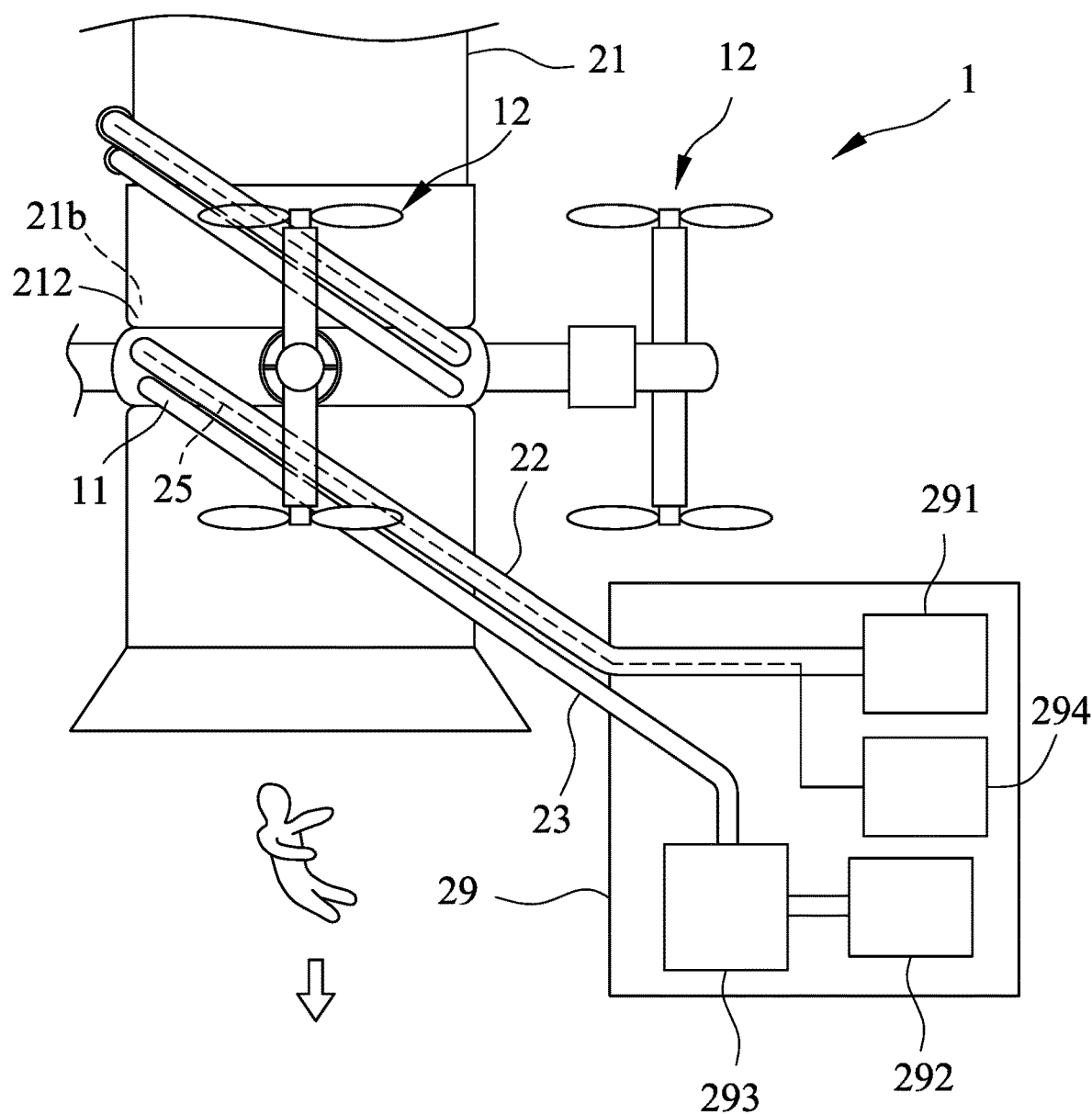
FIG. 10 is a fragmentary schematic view showing relationship between an air supply pipeline, a water supply pipeline, and an electrical power supply unit, while also showing a fire victim escaping toward the ground.

Referring to FIGS. 6 to 10 in combination with FIGS. 1 to 5, the conveying module 2 further includes an air jetting unit 16, an air supply pipeline 22, a water supply pipeline 23, a plurality of securing members 24, an electrical wire 25, a platform body 26, a plurality of railings 27, four emergency rescue devices 28, and a supply sources system 29 (see FIG. 10).

Figure 4:
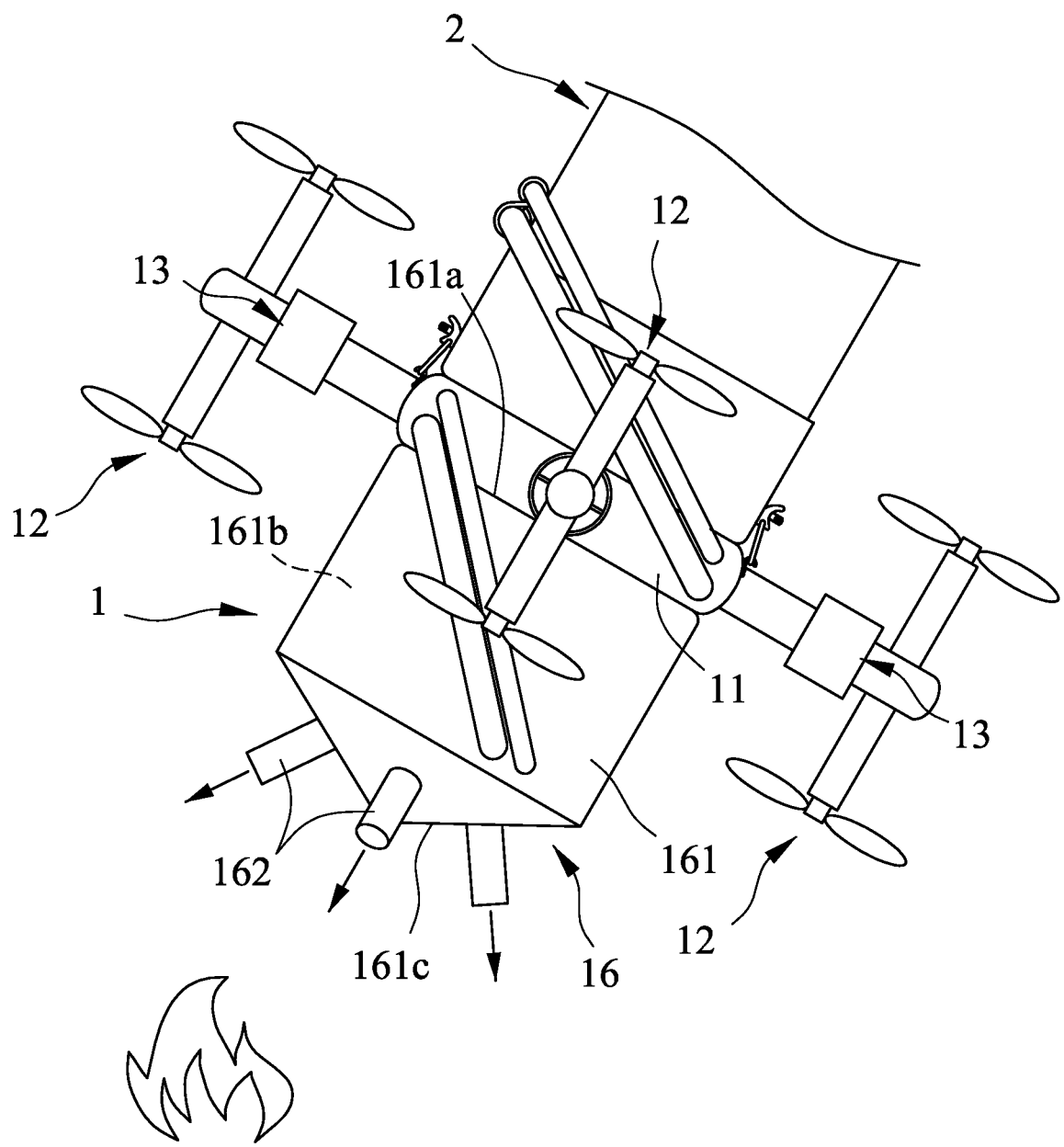
FIG. 4 is a fragmentary schematic view illustrating an air jetting unit of a conveying module of the first embodiment.

Referring to FIG. 4 in combination with FIGS. 1 and 2, the drone 1 turns its direction to change position for implementing an air jetting operation. The second pier 14 which is higher than the first pier 15 as shown in FIG. 1 is turned downward in FIG. 4 to be lower than the first pier 15. In FIG. 1, the conveying duct 21 is connected to the first pier 15 of the drone 1 and the platform body 16 is connected to the second pier 14. In FIG. 4, the air jetting unit 16 is connected to the second pier 14 instead of the platform body 26. The air jetting unit 16 includes a casing body 161 that has a casing open end 161a removably connected to and sleeved on the first pier 14, an interior air space 161b communicated with the frame hole 110 through the casing open end 161a to receive air from the frame hole 110, and a plurality of air jet nozzles 162 that are disposed on an end 161c of the casing body 161 opposite to the casing open end 161a and that are communicated with the interior air space 161b to jet air downwardly from the interior air space 161b. During a fire fighting action, the air jet nozzles 162 are pointed toward the flames, and air provided by the power-driven air suction unit 131 will flow into the frame hole 110 through the air delivery opening 117 formed by the first and second sheathing 115, 116, and exit through the jet nozzles 162 to extinguish the flames.

Referring back to FIGS. 1 and 5, the conveying duct 21 has a top duct open end 21a connected to the frame body 10 in alignment with and in spatial communication with the frame hole 110 of the frame body 10, a bottom duct open end 21b lower than the top duct open end 21a, and a slide channel 20 that extends from the top duct open end 21a to the bottom duct open end 21b. In this embodiment, the first pier 15, which projects downward from the bottom pipe wall 111 of the looped pipe body 11, is connected to the conveying duct 21 in communication with the top duct open end 21a of the conveying duct 21. When the drone 1 ascends, the frame body 10 pulls the top duct open end 21a of the conveying duct 21 upward to a higher altitude than an initial altitude, and a lowering movement is allowed through the frame holes 110 and the slide channel 20 from the higher altitude. The air supply pipeline 22 winds helically around the conveying duct 21. The water supply pipeline 23 winds helically around the conveying duct 21 and is spaced apart from the air supply pipeline 22. The plurality of securing members 24 are attached to the conveying duct 21, each being connected to the air supply pipeline 22 and the water supply pipeline 23. FIG. 1 shows five securing members 24; however, the number of securing members 24 is not a limitation of the disclosure, so long as the number of securing members 24 is sufficient to secure the air supply pipeline 22 and the water supply pipeline 23 to the conveying duct 21. The electrical wire 25 is installed inside the air supply pipeline 22.

Referring back to FIG. 1, the platform body 26 is connected to the second pier 14, and surrounds the axis (L) to define an escape portal 260 that is directly above the frame hole 110 of the drone 1. The plurality of railings 27 are disposed on top of the platform body 26. The emergency rescue devices 28 are disposed on the platform body 26. The supply sources assembly 29 (see FIG. 10) is connected to the air supply pipeline 22, the water supply pipeline 23, and the electrical wire 25 which is installed inside the air supply pipeline 22.

Referring back to FIG. 5, the conveying duct 21 includes a main tube body 211 with the top duct open 21a, which has a hem plate 212, an annular block 213, a plurality of fasteners 214, and multiple pivotal latching units 215. The top duct open end 21a is sleevingly connected to the first pier 15. The hem plate 212 is used to reinforce the top duct open end 21a and connect with the first pier 15 of the drone 1. The hem plate 212 is bent to extend over an inner surface and an outer surface of the top duct open end 21a, and is pressed against the top duct open end 21a to embed the top duct open end 21a. As shown in FIG. 10, the bottom duct open end 21b of the conveying duct 21 also has a hem plate 212 attached thereto for connection with a second pier 14 (not shown) of another drone 1. Referring back to FIG. 5, for connecting the top duct open end 21a to the first pier 15, the bard structures 152 of the first pier 15 projects from the outer surface of the first pier 15 and engages the hem plate 212 on the first pier 15. The annular block 213 projects inwardly from the top duct open end 21a and abuts against the first pier 15 of the drone 1. The fasteners 214 pass through the hem plate 212 and the top duct open end 21a, and fasten the hem plate 212 to the top duct open end 21a of the conveying duct 21. The pivotal latching units 215 are disposed at intervals on an outer side of the hem plate 212 for respectively engaging the latch hooks 124 on the looped pipe body 11. By virtue of the hem plates 212 which are respectively engageable with the barb structures 152, 142 of the first and second piers 15, 14, the top and bottom duct open ends 21a, 21b of the conveying duct 21 can be respectively firmly retained on the first pier 15 of an upper drone 1 and the second pier 14 of a lower drone 1.

In the first embodiment, the conveying duct 21 is made of a flexible and stretchable material such as rubber or canvas and is sleeved over the barb structure 152 of the first pier 15. In order for the conveying duct 21 to be more securely attached to the barb structure 152 of the first pier 15, the conveying duct 21 may have interlockable members, such as, buckles, hooks, to interlock with the barb structure 152. The air supply pipeline 22 is sleeved over the electric wire 25 to protect the electric wire from the external environment and prevent damage.

Referring back to FIGS. 1 and 9, each of the securing members 24 includes a securing main body 241 that has two sleeve rings 240 respectively sleeved onto the air supply pipeline 22 and the water supply pipeline 23, and two fixing plates 242 that are attached to an exterior surface of the conveying duct 21. The two sleeve rings 240 respectively have open ring sections 241a that respectively hook over and secure the air supply pipeline 22 and the water supply pipeline 23, and attachment sections 241b that are respectively connected to the two fixing plates 242. The securing main body 241 secures the air supply pipeline 22 and the water supply pipeline 23 in such a manner that the two pipelines are separated from each other. Since the two pipelines are wound helically around the conveying duct 21, if they are wound too tightly the two pipelines might abrade against each other, the securing main body 241 therefore prevents abrasion and entanglement of the two pipelines. The two fixing plates 242 supports the weight of the air supply pipeline 22 and the water supply pipeline 23, so that the two pipelines are wound stably and helically around the conveying duct 21. When the air supply pipeline 22 and the water supply pipeline 23 are being supplied with air and water, respectively, the two pipelines will expand and become tense, and tension from the expansion of the two pipelines will expand and inflate the conveying duct 21, thereby allowing personnel to slide through the slide channel 20 unobstructed.

Figure 6:
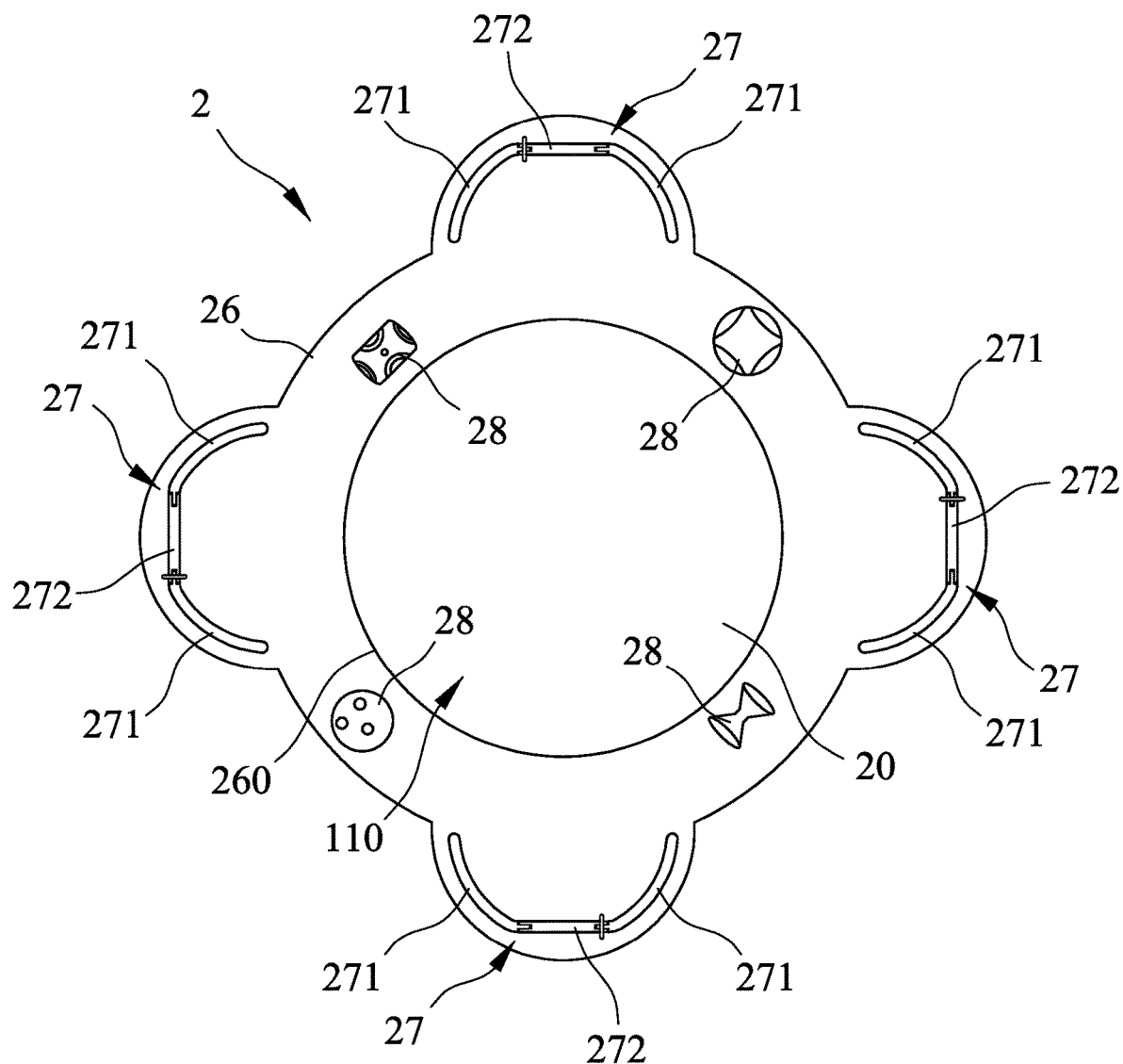
FIG. 6 is a schematic top view showing a platform body and railings of the conveying module.
Figure 7:
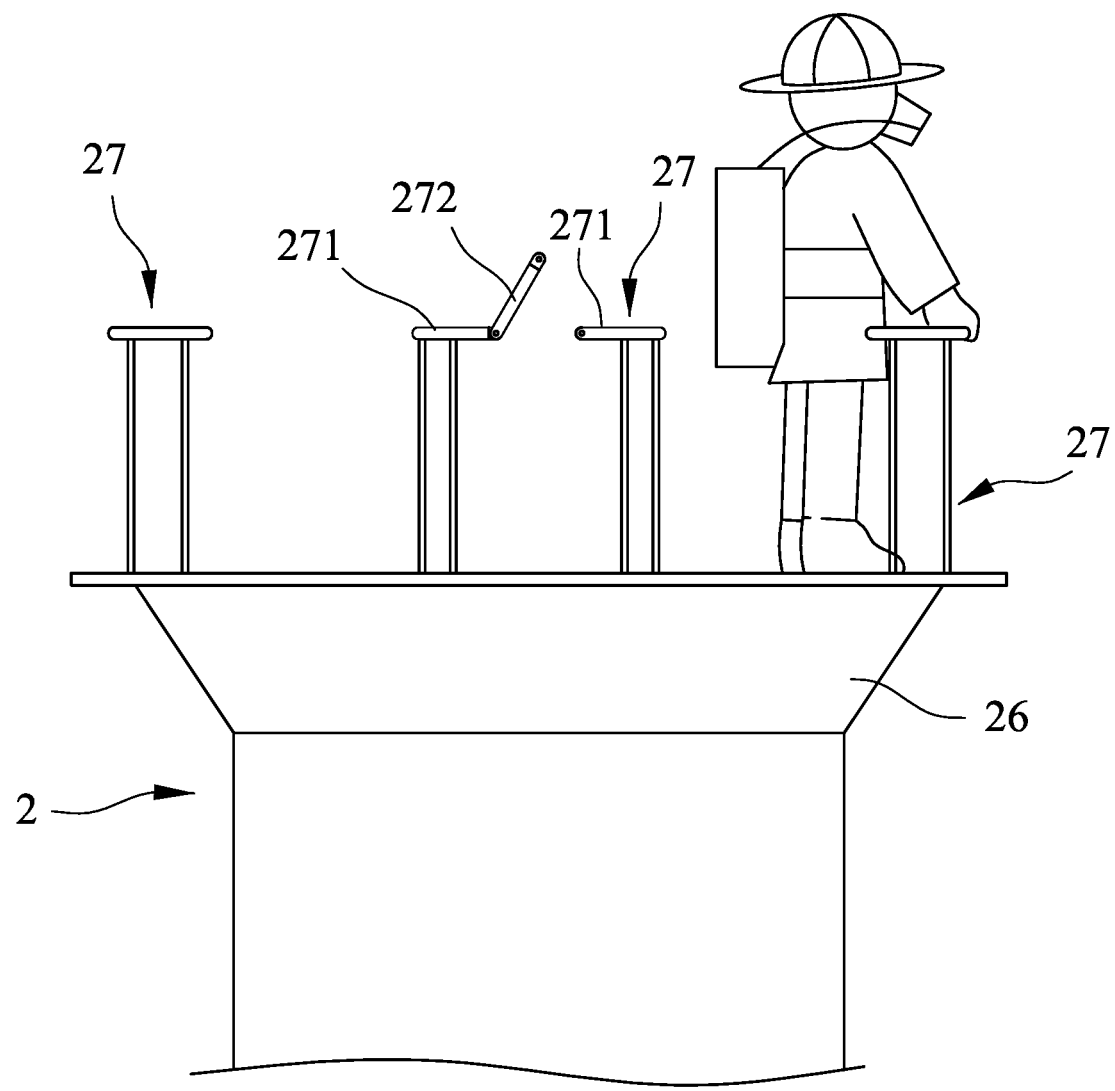
FIG. 7 is a fragmentary side view illustrating the platform body used to carry a firefighting and rescue personnel.
Figure 8:
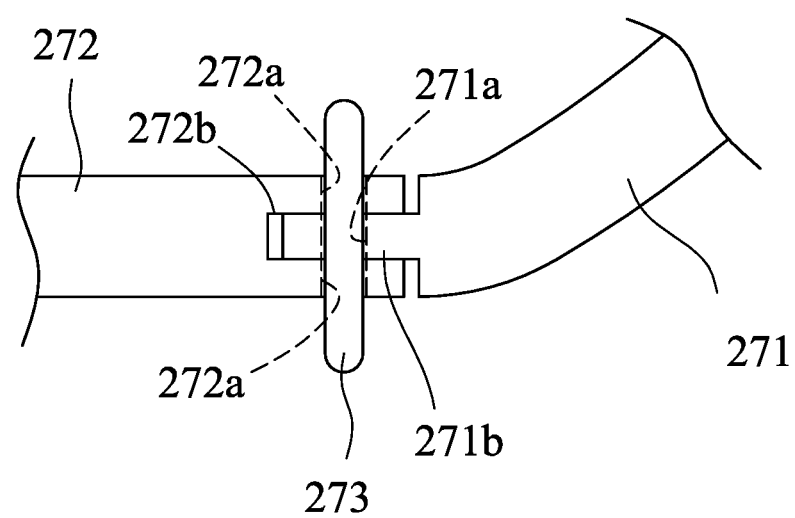
FIG. 8 is a fragmentary schematic side view illustrating two grip sections and an interconnecting section of one of the railings of the conveying module.
Figure 9:
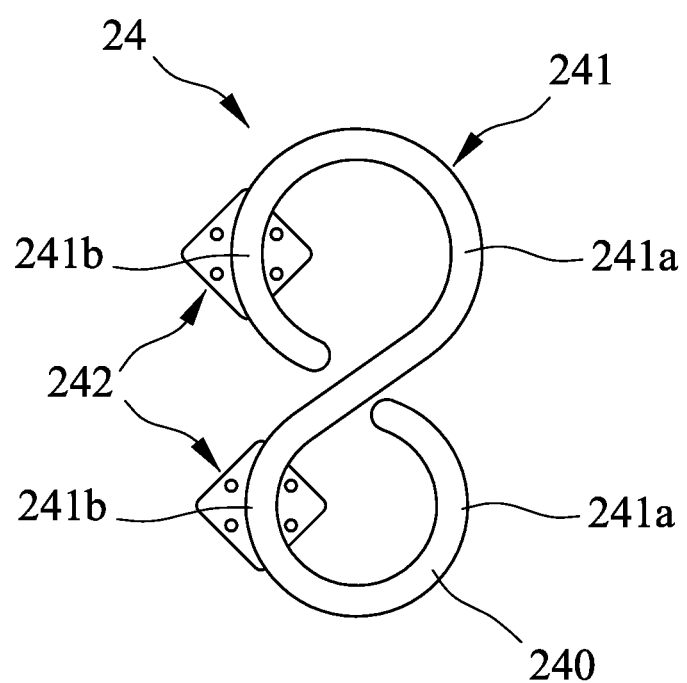
FIG. 9 is side view illustrating a securing member of the conveying module.

Referring to FIGS. 6 and 8 in combination with FIG. 1, each of the railings 27 disposed on the platform body 26 includes two grip sections 271, a bridging section 272 interconnecting the two grip sections 271, and a fastening member 273 fastening each of the grip sections 271 to the bridging section 272. The two grip sections 271 each have a protruding tongue 271b that has a first positioning through hole 271a extending transversely. The bridging section 272 has a bifurcated portion 272b to receive and mate with the protruding tongue 271b. The bifurcated portion 272b has two second positioning through holes 272a that are spaced apart, and that are both aligned with the positioning hole 271a, and that extends transversely. The fastening member 273 extends through the two second positioning through holes 272a and the first positioning through hole 271a, thereby connecting the two grip sections 271 to the bridging section 272. More specifically the fastening member 273 may be a climbing carabiner or clamp lock. In this embodiment, the bridging section 272 is pivotal relative to one of the grip sections 271, and the fastening member 273 is configured such that it can extend through the two second positioning through holes 272a and the first positioning through hole 271a in a normal state so as to fix a free end of the bridging section 272 to the other grip section 271, but that can also be removed from the first and second through holes as required to allow firefighting and rescue personnel to separate the bridging section 272 from the grip section 271 (see FIG. 7) which allows exit via the railings 27. Additionally, the positioning member 273 may be used by firefighting and rescue personnel to attach quickdraws and secure their harnesses to the railings 27 which may allow the firefighting and rescue personnel to work safely at higher altitudes.

The emergency rescue devices 28 are disposed on the platform body 26, and may be connected to the air supply pipeline 22, the water supply pipeline 23, and the electric wire 25. The emergency rescue devices 28 may be, including but not limited to, water mist nozzles, search lights, loudspeakers or camera equipment. The emergency rescue devices 28 may aid fire fighting and rescue personnel to quickly monitor the situation of the fire, and can provide firefighting functions such as water spraying, or rescue functions such as providing lighting or broadcasting in a fire situation to direct fire victims towards safety.

The supply sources assembly 29 includes an air pump 291, a water reservoir tank 292, a water pump 293, and an electrical power supply 294. The air pump 291 is connected to the air supply pipeline 22, and is adapted to pump air into the air supply pipeline 22. The water reservoir tank 292 is connected to the water supply pipeline 23, and holds a fire suppression liquid. The water pump 293 is connected to the water supply pipeline 23 and the water reservoir tank 292 and is adapted to pump the fire suppression liquid to the water supply pipeline 23. The electrical power supply 294 supplies electricity to the electric wire 25.

Figure 14:
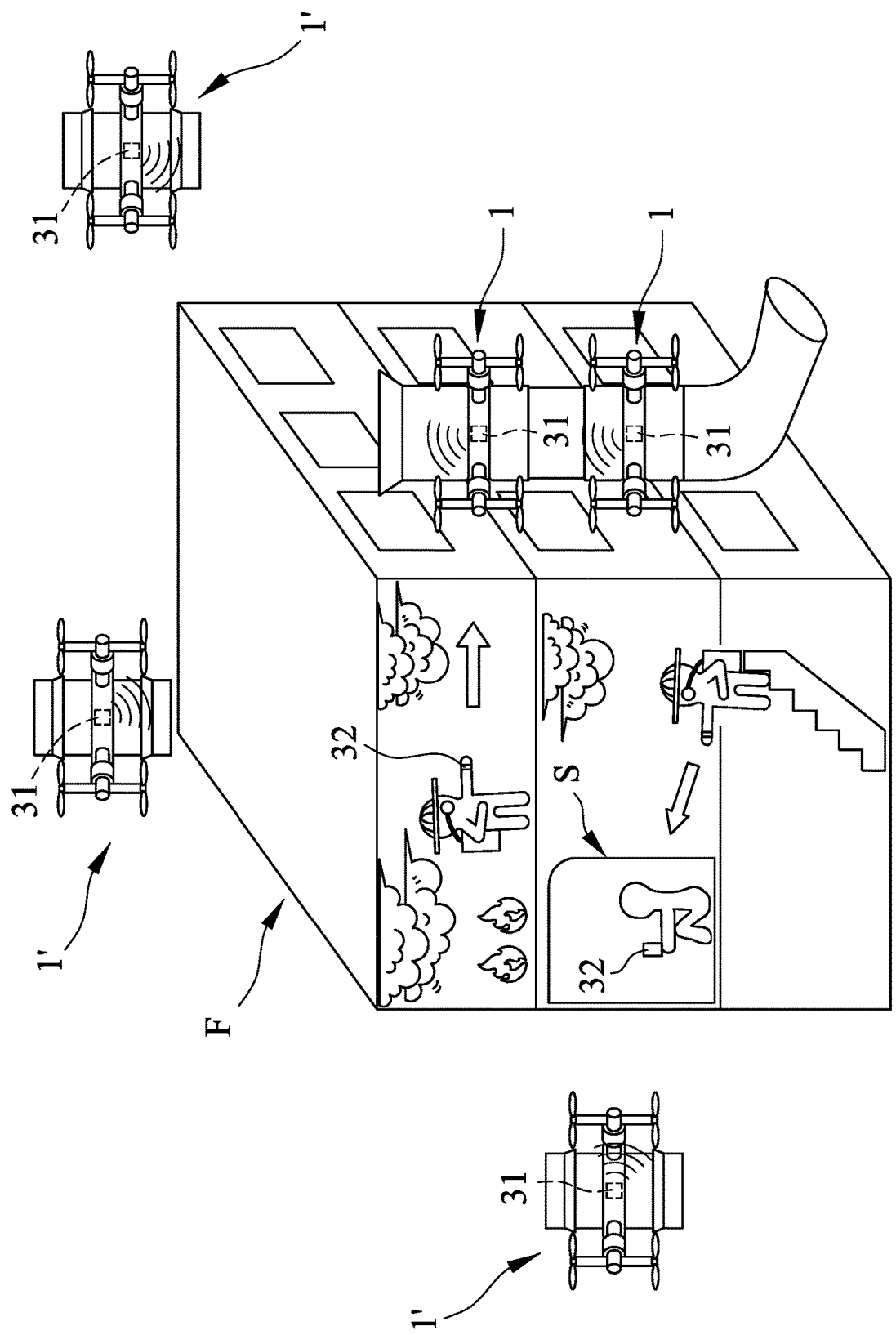
FIG. 14 is a schematic view illustrating a system according to a third embodiment of the present disclosure.

Referring to FIG. 14 in combination with FIG. 1, the communication module 3 includes at least one communication device 31 that is disposed on the looped pipe body 11, and at least one tracking device 32 that is signally connected to the at least one communication device 31, and that tracks positioning of the at least one communication device 31. In this embodiment the communication device 31 and the tracking device 32 may be signally connected via UWB (ultra-wideband) communication, Bluetooth®, or Zigbee®. In some embodiments, there may be a plurality of different tracking devices 32 that may be signally connected to each other. The tracking devices 32 may be worn by trapped fire victims or fire rescue workers. In some embodiments, the tracking devices 32 may be mobile phones, personal digital assistants (PDA), laptop computers, tablet computers, or remote controllers that utilize ultra-wide band communication. More specifically, the tracking devices 32 may have the functionality of providing directional indication and distance information, to indicate direction and distances between the tracking devices 31 and the communication devices 32.

When the flying conveyor device is in use, the top duct open end 21a of the conveying duct 21 of one conveying module 2 is sleeved around the first pier 15 of the drone 1, the bottom duct open end 21b is hung freely proximate to the ground as shown in FIG. 10. The platform body 26 is connected to the second pier 14 as shown in FIG. 1. The drone 1 is operated to fly to a higher altitude and move toward a fire situation in a high-rise building. The aerial agility of the drone 1 is fully utilized to deliver the platform body 26 via the drone 1 to the fire. When the platform body 26 reaches the site of the fire in the high-rise building, one of the emergency rescue devices 28 implemented as a search light is turned on so that victims trapped by the fire may locate the position of the platform body 26. Another one of the emergency rescue devices 28 may be implemented as a loudspeaker to provide directions to the fire victims and direct them towards the platform body 26.

The fire victims may be directed by the rescue devices 28 to escape the fire by jumping into the escape portal 260 and sliding through the slide channel 20. Because the conveying duct 21 is made of a flexible and stretchable material, the conveying duct 21 may be twisted or bent to circumvent any obstructions, buildings or high-rises near the site of the fire, thereby offering the fire victims a safe route for escape to ground level.

It should be noted that, in addition to the functionality described above, the first embodiment of the disclosure may also be used as a water slide in a water park or an amusement park. A user may enter the escape portal 260 of the platform body 26 and slide down through the slide channel 20 for entertainment. Therefore, the flying conveyor device is adaptable for various functions and is not only limited to rescuing fire or disaster victims.

Figure 11:
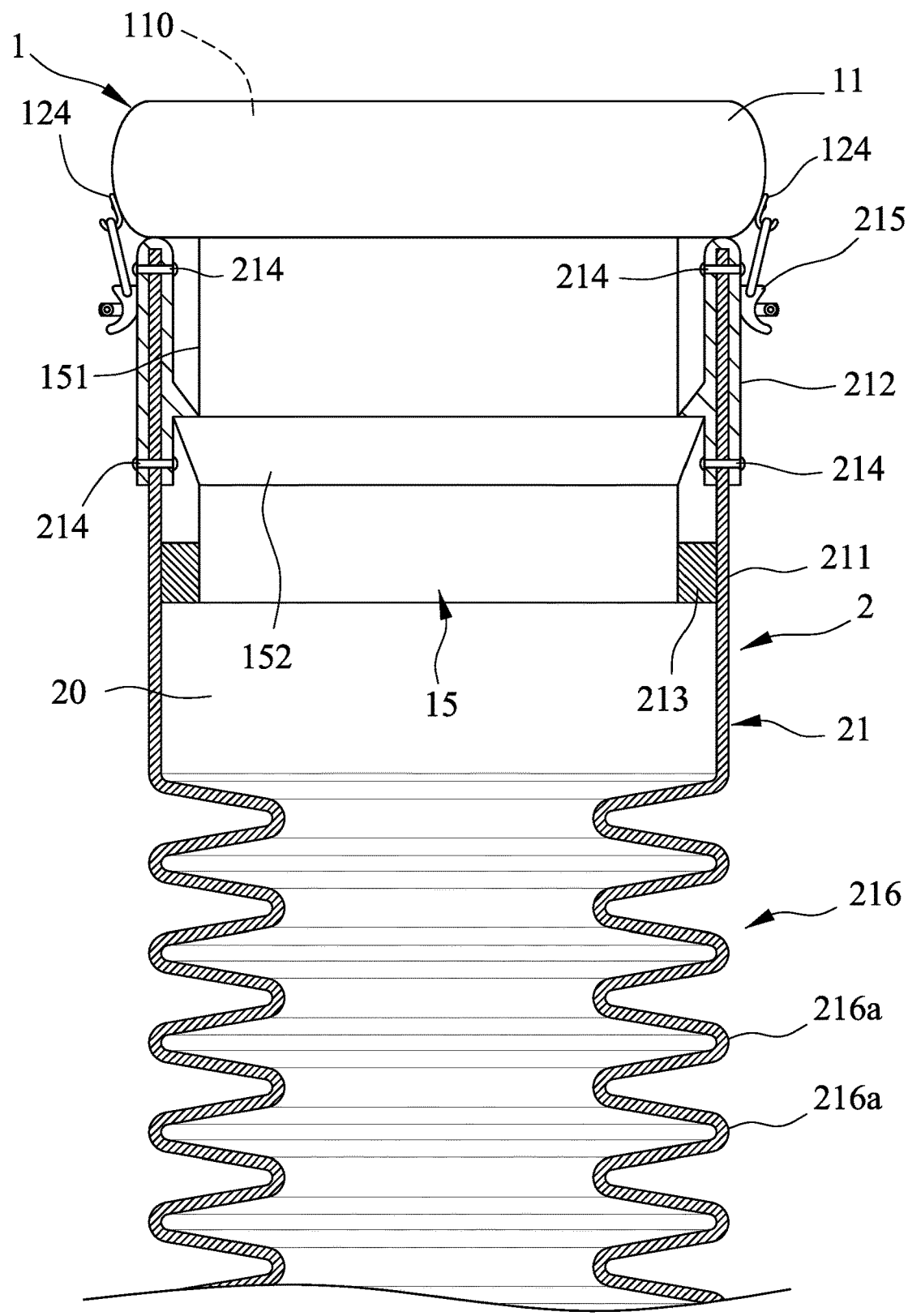
FIG. 11 is a fragmentary partially cross-sectional view illustrating a variation of the first embodiment including a plurality of folded segments.

Referring to FIG. 11, a variation of the first embodiment is similar to the first embodiment except that the conveying duct 21 further includes a telescoping section 216 that is connected to the main tube body 211, and that has a plurality of folded segments 216a. The folded segments 216a of the telescoping section 216 allows the main tube body 211 to telescope and increase or decrease its length. The main tube body 211 allows fire victims to reach ground level by adjusting the length of the tube body 211 according to the altitude of the fire.

Figure 12:
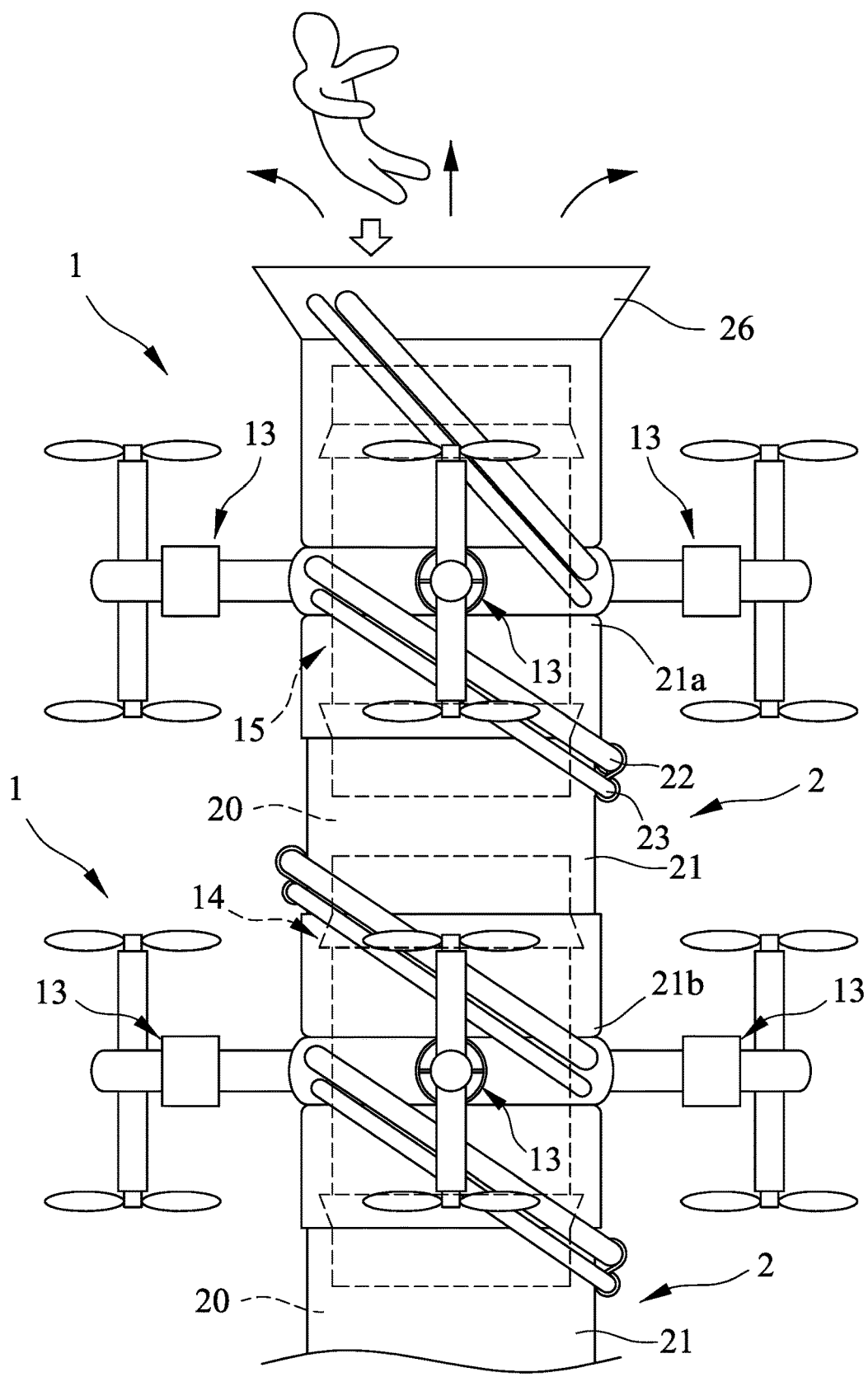
FIG. 12 is a fragmentary schematic side view illustrating a flying conveyor device according to a second embodiment of the present disclosure.

Referring to FIG. 12, a second embodiment of the flying conveyor device according to the present disclosure is similar to the first embodiment. However, the flying conveyor device of the second embodiment includes a plurality of the drones 1. Each of the drones 1 has the frame body 10 that includes the looped pipe body 11 the first pier 15 and the second pier 14. The flying conveyor device of the second embodiment also includes a plurality of conveying modules 2. The conveying duct 21 of each of the conveying modules 2 has the top duct open end 21a and the bottom duct open end 21b. Furthermore the first pier 15 and the second pier 14 of each of the drones 1 (e.g., the lower drone 1 in FIG. 12) are respectively connected to a top duct open end 21a of one of the conveying ducts 21 and the bottom duct open end 21b of another one of the conveying ducts 21. The bottom duct open end 21b and the top duct open end 21a of each of the conveying ducts 21 are respectively connected to the first pier 15 of one of the drones 1 and the second pier 14 of another one of the drones 1. The air supply pipeline 22 and the water supply pipeline 23 wind helically around the conveying ducts 21 of each of the conveying modules 2. The conveying duct 21 of each of the conveying modules 2 has a top duct open end 21a connected to a frame body 10 of each drone 1 and spatially communicated with the frame hole 110 of the frame body 10 of the drone 1. The slide channel 20 of each of the conveying modules 2 are connected with each other. The frame body 10 of each drone 1 is communicated with the slide channel 20 of the respective conveying module 2.

When the second embodiment of the flying conveyor device is in operation, firefighting and rescue personnel may individually adjust the aerial position of each of the drones 1 of the flying conveyor device. Since the conveying ducts 21 of each of the conveying modules 2 are made of a flexible and stretchable material, the conveying duct 21 of each of the conveying modules 2 may remain connected to the first pier 15 of the frame body 10 of each of the drones. This allows the firefighting and rescue personnel to adjust the inclining angle of the slide channel 20 of each of the conveying modules 2 so that the inclining angle is gently sloping downward and thereby allowing fire victims to safely slide toward the ground. Furthermore with the design of the air supplying unit 13 and the first and second sheathings 115, 116 of the looped pipe body 11 of the frame body 10 of each of the drones 1, air is allowed to flow through the air delivery opening 117 and form an upward current within the frame hole 110 of the frame body 10. FIG. 12 shows the upward current blowing out of the escape portal 260 of the platform body 26. The upward current may disperse smoke from a fire and improve visibility of fire victims allowing for better visibility to escape. At the same time, the upward current provides lift for the fire victims when the fire victims are sliding down the slide channel 20, which cushions the fall of the fire victims and decreases their rate of descent toward the ground. This allows the fire victims to slide down the slide channel 20 at a slower speed that helps to increase the safety, and comfort of the fire victims.

Additionally, the flying conveyor device may be used to rescue victims trapped between two bridge piers of a bridge that is collapsed due to flooding. In this type of rescue scenario, the flying conveyor device of the second embodiment may be used by rescue workers to transport trapped victims between the two bridge piers. In this scenario, the conveying duct 21 may be made of a more rigid material with a higher hardness and better weight bearing characteristics. The two drones 1 at two separate ends of the flying conveyor device may be respectively flown to the two bridge piers of the collapsed bridge so that the slide channel 20 is positioned horizontally, and the trapped victims of the flooding may be transported between the two bridge piers by crawling through the slide channel 20 to reach safety.

Figure 13:
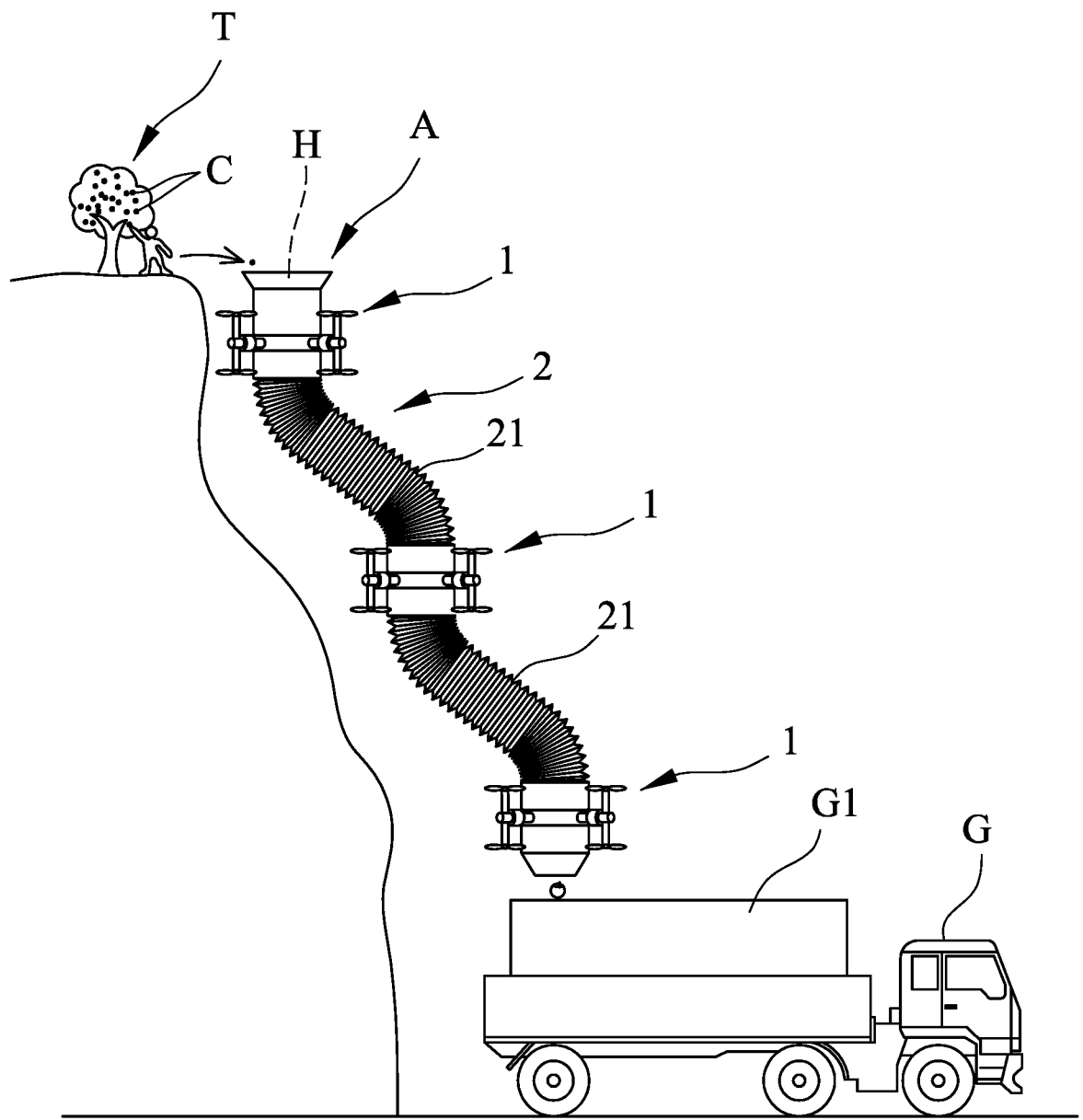
FIG. 13 is a fragmentary schematic side view illustrating a variation of the second embodiment.

Referring to FIG. 13, in one implementation of the second embodiment, the flying conveyor device is implemented by using three drones 1 assembled with two conveying modules 2. A collector main body (A) with a collector opening (H) is connected to the second pier 14 of a top one of the drones 1, and a conveying duct 21 is connected to the first pier 15 of that top drone 1. A bottom one of the drones 1 is controlled to hover over a cargo bed (G1) of a truck (G) that is used to transport produce (C). A middle one of the drones 1 has the first and second piers 15, 14 respectively connected to the two conveying ducts 21. The other ends of the two conveying ducts 21 are respectively connected to the top and bottom drones 1. The collector opening (H) of the collector main body (A) is adapted for receiving produce.

When an agricultural worker operates the three drones 1 to fly upward so that the top drone 1 is positioned next to a fruit bearing tree (T) bearing a plurality of agricultural produce (C). The three drones are maneuvered to remain appropriately spaced apart, so that the two conveying modules 2 are arranged in a gently snaking arrangement as shown in FIG. 13. When the agricultural worker collects agricultural produce (C) from the fruit bearing tree (T) and throws the agricultural produce (C) through the collector opening (H) of the collector main body (A), the agricultural produce (C) will fall under gravity through the slide channel 20 of the conveying module 2 and into the cargo bed (G1) of the truck (G) without being damaged. The flying conveyor device helps the agricultural worker complete the collection of fruit produce from difficult to reach environments with high efficiency, thereby saving time, and labor costs.

Referring to FIG. 14, a system, particularly, a fire rescue system, according to a third embodiment of the present disclosure is shown, which includes three search drones 1' and the flying conveyor device of the second embodiment having two drones 1. The search drones 1' are not assembled with the conveying ducts 21 of the conveying modules 2. However, like the drone 1 of the second embodiment, the search drones 1' have the communication devices 31. The drones 1, 1' hover around a building (F) that is on fire, and the communication devices 31 of the drones 1, 1' are signally connected to each other, and signally connected to the tracking devices 32.

By utilizing the characteristics of ultra-wideband (UWB) communication, a fire rescue worker may use the tracking devices 32 to find a trapped fire victim hiding in a safe space(S) awaiting rescue. The trapped fire victim will communicate with the fire rescue worker via another tracking device 32 that is carried by the trapped fire victim, thereby allowing the fire rescue worker to find the trapped fire victim. By virtue of using the tracking device 32, even when the fire rescue worker's line of sight is obscured by smoke from the fire, the fire rescue worker may still use the tracking device 32 to find the trapped fire victim and to escort the trapped fire victim towards a nearest drone 1 via the directional indication of the tracking device 32, on the same story of the building (F). At this moment, personnel on the ground level may maneuver the escape portal 260 of the platform body 26 to move toward the position of the fire rescue worker and the trapped fire victim, allowing them to escape from the building (F) by sliding down along the slide channel 20.

In summary of the above, in the flying conveyor device according to the present disclosure through the inclusion of the at least one drone 1 that has high aerial maneuverability and the ability to hover, the flying conveyor device can be operated to quickly be positioned into a difficult to reach disaster site and provide a means of escape for trapped victims of a disaster or a fire. Additionally, the flying conveyor device can be maneuvered into a snaking arrangement to steer clear of obstructions and obstacles which allows the flying conveyor device to be used for fire or disaster situations that are difficult for rescue workers to reach and operate in. Trapped victims may jump through the escape portal 260 of the platform body 26 to slide down the slide channel 20 to safety and escape a fire or disaster situation. Furthermore by connecting each of two or more conveying modules 2 to different drones 1, the flying conveyor device may be used to help collect agricultural produce (C) from elevated and difficult to reach sites, the agricultural produce (C) may slide down the slide channel (20) and be transported to ground level for collection by the agricultural worker which has the benefit of increasing labor efficiency, saving time and reducing costs.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A flying conveyor device comprising:
    at least one drone including a frame body that loops around an axis to define a frame hole, and a plurality of aeronautic units that are connected to said frame body and that are spaced apart angularly around said frame body, said frame hole extending in a top-bottom direction along the axis and being opened at top and bottom ends of said frame body; and
    at least one conveying module connected to said at least one drone, and including a conveying duct that is connected beneath said frame body and that has a top duct open end connected to said frame body in alignment with and in spatial communication with said frame hole of said frame body, a bottom duct open end lower than said top duct open end, and a slide channel that extends from said top duct open end to said bottom duct open end;
    wherein, when said at least one drone ascends, said frame body pulls said top duct open end of said conveying duct upward to a higher altitude, and a descending movement from the higher altitude is allowed through said frame hole and said slide channel.

2. The flying conveyor device as claimed in claim 1, wherein said frame body of said at least one drone includes a looped pipe body that loops around the axis, and a first pier that projects downward from a bottom side of said looped pipe body and that loops around the axis, said looped pipe body and said first pier cooperatively defining said frame hole, said top duct open end of said conveying duct being sleeved around and connected to said first pier.

3. The flying conveyor device as claimed in claim 1, wherein said frame body of said at least one drone includes a looped pipe body that loops around the axis, a first pier that projects downward from a bottom side of said looped pipe body, and that loops around the axis, and a second pier, that projects upward from a top side of said looped pipe body, and that loops around the axis, said looped pipe body, said first pier and said second pier cooperatively defining said frame hole, said top duct open end of said conveying duct being sleeved around and connected to said first pier.

4. The flying conveyor device as claimed in claim 2, wherein:
    said top duct open end is sleeved around an outer surface of said first pier, and has a hem plate that is bent to extends over an inner surface and an outer surface of said top duct open end, and that is pressed against said top duct open end to embed said top duct open end, and a plurality of fasteners that fasten said hem plate to said top duct open end; and
    said first pier has a barb structure which projects from said outer surface of said first pier to engage and firmly retain said joining plate on said first pier.

5. The flying conveyor device as claimed in claim 2, wherein:
    said looped pipe body has an inner pipe wall that surrounds the axis, borders said frame hole and extends in a top-bottom direction, an outer pipe wall that surrounds said inner pipe wall and extends in the top-bottom direction, a bottom pipe wall that is connected between a bottom end of said inner pipe wall and a bottom end of said outer pipe wall, a top pipe wall that is connected between a top end of said outer pipe wall and a top end of said inner pipe wall; and
    said first pier projects downward from said bottom pipe wall of said looped pipe body, and is connected with said top duct open end of said conveying duct.

6. The flying conveyor device as claimed in claim 2, wherein each of said aeronautic units has a propeller, and a supporting pipe that interconnects between said looped pipe body and said propeller.

7. The flying conveyor device as claimed in claim 6, wherein said drone further includes a plurality of air supplying units respectively disposed on said aeronautic units, each of said air supplying units has:
    an air duct that is bounded by an inner surface of a respective one of said supporting pipes, and that communicates with said frame hole of said frame body;
    a plurality of air inlet holes that extend from an outer surface of the respective one of said supporting pipes to said inner surface of the respective one of said supporting pipes to communicate with said air duct; and
    a power-driven air suction unit disposed inside said air duct to draw air from said air inlet holes into said air duct and thereafter to said frame hole.

8. The flying conveyor device as claimed in claim 7, wherein said supporting pipe has an inner pipe portion that is connected to said looped pipe body opposite said aeronautic unit, and that penetrates through said outer pipe wall and said inner pipe wall to extend into and communicate with said frame hole.

9. The flying conveyor device as claimed in claim 8, wherein:
    said looped pipe body further includes a first sheathing and a second sheathing that are both connected to said inner pipe wall;

said first sheathing loops around the axis, projects inwardly and downwardly into said frame hole from said top end of said inner pipe wall; and said second sheathing loops around the axis, projects inwardly and upwardly into said frame hole from said bottom end of said inner pipe wall, said first sheathing and said second sheathing cooperating with said inner pipe wall to confine a looped air delivery space around the axis, which is communicated with said frame hole, said inner pipe portion of said supporting pipe having an innermost end communicated with said looped air delivery space.

10. The flying conveyor device as claimed in claim 9, wherein said second sheathing has an uppermost end that is spaced apart from said inner piper wall and that is higher than said bottom end of said inner pipe wall and lower than said top end of said inner pipe wall, said first sheathing partially extending into a space between said second sheathing and said inner pipe wall and having a lowermost end that is spaced apart from said uppermost end and said inner pipe wall, and that is lower than said uppermost end and higher than said bottom end of said inner pipe wall, said first sheathing and said second sheathing having overlapping portions that extend between a level of said uppermost end and a level of said lowermost end and that form therebetween an air delivery opening which extends upward from said looped air delivery space.

11. The flying conveyor device as claimed in claim 3, wherein said at least one conveying module further includes an air jetting unit including a casing body that has a casing open end removably connected to said second pier, an interior air space communicated with said frame hole through said casing open end, and a plurality of air jet nozzles that are disposed on an end of said casing body opposite to said casing open end and that are communicated with said interior air space to jet air downwardly from said interior air space.

12. The flying conveyor device as claimed in claim 5, wherein:

said at least one drone includes a plurality of drones, each of said drones having said frame body that includes said looped pipe body, said first pier and said second pier;

said at least one conveying module includes a plurality of conveying modules, said conveying duct of each of said conveying modules having said top duct open end and said bottom duct open end;

said first pier and said second pier of each of said drones are respectively connected to said top duct open end of one of said conveying ducts and said bottom duct open end of the other one of said conveying ducts; and said top duct open end and said bottom duct open end of each of said in conveying ducts are respectively connected to said first pier of one of said drones and said second pier of the other one of said drones.

13. The flying conveyor device as claimed in claim 1, wherein said at least one conveying module further includes an air supply pipeline that winds helically around said at least one conveying duct, and a water supply pipeline that winds helically around said conveying duct and spaced apart from said air supply pipeline.

14. The flying conveyor device as claimed in claim 13, wherein:

said at least one conveying module further includes a plurality of securing members attached to said conveying duct, and each being connected to said air supply pipeline and said water supply pipeline; and each of said securing members includes a securing main body that has two sleeve rings respectively sleeved onto said air supply pipeline and said water supply pipeline, and two fixing plates that are attached to an exterior surface of said conveying duct.

15. The flying conveyor device as claimed in claim 3, wherein said at least one conveying module further includes:

a platform body connected to said second pier, and surrounding the axis to define an escape portal that is directly above said frame hole of said at least one drone; and a plurality of railings disposed on top of said platform body.

16. The flying conveyor device as claimed in claim 2, wherein, said conveying duct includes a main tube body that is connected to said first pier, and a telescoping section that is connected to said main tube body, and that has a plurality of folded segments.

17. The flying conveyor device as claimed in claim 1, wherein each of said aeronautical units has a ducted propeller fan.

18. The flying conveyor device as claimed in claim 1, further comprising a communication module adapted for exchange of information and including at least one communication device that is disposed on said looped pipe body.

19. The flying conveyor device as claimed in claim 18, wherein said communication module further includes at least one tracking device that is signally connected to said at least one communication device, and that tracks positioning of said at least one communication device.

* * * * *